US012637020B2

(12) United States Patent
Herzogenrath et al.

(10) Patent No.: US 12,637,020 B2
(45) Date of Patent: May 26, 2026

(54) VEHICLE POWER ARCHITECTURE, POWER CONTROL MODULE AND ASSOCIATED METHOD

(71) Applicant: Aptiv Technologies AG, Schaffhausen (CH)

(72) Inventors: Pekka Herzogenrath, Wuppertal (DE); Daniel Staudt, Bochum (DE); Lukas Puellen, Wuppertal (DE); Tobias Merten, Düsseldorf (DE)

(73) Assignee: Aptiv Technologies AG, Schaffhausen (CH)

( * ) Notice: Subject to any disclaimer, the term of this patent is extended or adjusted under 35 U.S.C. 154(b) by 287 days.

(21) Appl. No.: 18/065,338

(22) Filed: Dec. 13, 2022

(65) Prior Publication Data

US 2023/0264640 A1     Aug. 24, 2023

(30) Foreign Application Priority Data

Feb. 21, 2022     (GB) ...................................... 2202310

(51) Int. Cl.
B60R 16/023 (2006.01)
B60R 16/03 (2006.01)

(52) U.S. Cl.
CPC .......... B60R 16/0231 (2013.01); B60R 16/03 (2013.01)

(58) Field of Classification Search
CPC ..... B60R 16/0231; B60R 16/03; B60R 16/02; B60R 16/023
USPC .................................................. 700/1; 701/1
See application file for complete search history.

(56) References Cited

U.S. PATENT DOCUMENTS

| | | | |
|---|---|---|---|
| 2006/0152090 A1 | 7/2006 | Hubert et al. | |
| 2014/0226673 A1* | 8/2014 | Hirashima | H04L 12/4625 |
| | | | 370/401 |
| 2022/0227318 A1* | 7/2022 | Kurokawa | H02J 1/08 |

FOREIGN PATENT DOCUMENTS

| | | | | |
|---|---|---|---|---|
| CN | 102874190 A | * | 1/2013 | |
| CN | 112019414 A | | 12/2020 | |
| CN | 115071601 A | | 9/2022 | |
| DE | 102010026772 A1 | | 1/2012 | |
| DE | 102017105587 A1 | | 10/2017 | |
| EP | 1564077 A1 | * | 8/2005 | H02H 3/087 |

(Continued)

OTHER PUBLICATIONS

Nat45928 "Shutdown Circuit Power Stage" Reddit.com, 2016 (Year: 2016).*

(Continued)

Primary Examiner — Tiffany P Young
Assistant Examiner — Shien Ming Chou
(74) Attorney, Agent, or Firm — Harness, Dickey & Pierce, P.L.C.

(57) ABSTRACT

Vehicle power architecture including a plurality of functional blocks for implementing functions, a power supply input for receiving a direct current power supply, and an electric control unit, ECU. The ECU includes a control block for controlling the plurality of functional blocks to perform functions, and a plurality of power control switches, each being switchable under the control of the control block between a closed state where at least one respective functional block is connected to the power supply input and an open state where the at least one respective functional block is disconnected from the power supply input. The power control switches may be part of a power control module.

17 Claims, 2 Drawing Sheets

(56) References Cited

FOREIGN PATENT DOCUMENTS

EP          3950435  A1     2/2022
JP          6464901  B2     2/2019

OTHER PUBLICATIONS

Knight "Understanding Electronic Control Units (ECUs) in Connected Automotbiles and How They Can be Hacked", levelblue.com (Year: 2016).*
Abasolo, "common switches used in electronics projects", CircuitBasics.com (Year: 2020).*
"Search Report", GB Application No. 2202310.5, Aug. 17, 2022, 4 pages.
"Search Report", GB Application No. 2202311.3, Aug. 17, 2022, 4 pages.
"Search Report", EP Application No. 23155280.3, Jun. 21, 2023, 7 pages.
"Search Report", EP Application No. 23155424.7, Jul. 21, 2023, 8 pages.

* cited by examiner

VEHICLE POWER ARCHITECTURE, POWER CONTROL MODULE AND ASSOCIATED METHOD

CROSS-REFERENCE TO RELATED APPLICATION

This application claims priority to United Kingdom Patent Application Number 2202310.5, filed Feb. 21, 2022, the disclosure of which is hereby incorporated by reference in its entirety herein.

BACKGROUND

The present disclosure relates to a vehicle power architecture, and a power control module for use in vehicle power architecture. The present disclosure also concerns a method of operating an electric control unit (ECU) in a vehicle power architecture.

In recent years, ECUs have become more and more important in vehicle applications, and particularly in architectures supporting autonomous driving (AD) and advanced driver-assistance systems (ADAS). ECUs are tasked with implementing various functions, including control functions, processing operations and peripheral component interfaces.

FIG. 1 shows an illustrative vehicle power architecture 1 including an ECU 2, which in this example is a multi-domain controller (MDC). The ECU 2 includes a plurality of internal blocks 6,7, such as safety processors and performance processors for performing safety and performance functions. The power architecture 1 may also include external blocks 4,5, such as sensors and actuators, for performing sensing and actuating functions. Each of the internal and external blocks 4, 5, 6, 7 include a number of main sub-blocks which implement specific functionality. For instance, sub-blocks 41, 51, 61, 71 may include various different kinds of computing units, such as central processing units (CPUs), application-specific integrated circuits (ASICs), microcontroller units (MCUs), field-programmable gate arrays (FPGAs), and system-on-chips (SOCs). In addition, the sub-blocks 4 will also contain certain basic sub-blocks that are essential to the working of the block as a whole, such as power management stage sub-blocks 43, 53, 63, 73 (e.g., power management integrated circuits, PMICs). The ECU 2 further includes a control block 3 to control operations at the different blocks 4, 5, 6, 7.

Whilst the above example notionally relates to a domain architecture, it will be understood that zonal architectures adopt a similar arrangement to the above, albeit that the ECU 2 will function as a zone controller, serving as a hub for the power distribution and data connection requirements for functional blocks within the associated physical section of the vehicle. Typically, in such arrangements, like that shown in FIG. 2, a central vehicle controller (CVC) 8 will relay commands to the ECU 2 via a common vehicle communication layer 81, such as a control area network (CAN) bus or ethernet. The control block 3 may process the command and switch on the relevant blocks 4, 5, 6, 7 by sending a wake signal to the respective power management sub-blocks 43, 53, 63, 73 within the block or blocks in question.

A problem with the above architectures, however, is that in order to power the main sub-blocks 41, 51, 61, 71, the power management sub-blocks 43, 53, 63, 73 of the blocks must be connected to a constant live, direct current power supply input 9 (e.g. KL30 rail-DIN 72552), via a plurality of power lines 91, 92, 93, 94 so that they remain live in order to implement the wake-up process when instructed. Consequently, a constant idle current is drawn from the permanent power supply, which, over time, will drain the vehicle battery. Furthermore, implementing wake up mechanisms in the PMICs 43, 53, 63, 73 increases the complexity of these block arrangements, which in turn increases costs and the overall PCB footprint.

To attempt to address the above problems, some solutions have been proposed which utilize power stages with lower idle currents. However, this requires the usage of integrated currents (ICs), which not only adds costs, but also significantly increases the general complexity by necessitating a power management sub-block having both wakeup and shut-off capabilities. Furthermore, such solutions only partly mitigate the issues because the initial power stages must still be powered by the power supply when idle.

Accordingly, there remains a need to address the above shortcomings in conventional power architectures.

SUMMARY

According to a first aspect, there is provided an vehicle power architecture, including: a plurality of functional blocks for implementing functions; a power supply input for receiving a direct current power supply; and an electric control unit, ECU, including a control block for controlling the plurality of functional blocks to perform functions, and a plurality of power control switches, wherein the control block is configured for operating each of the power control switches between a closed state where at least one respective functional block is connected to the power supply input and an open state where the at least one respective functional block is disconnected from the power supply input.

In this way, the functional blocks are not directly connected to the direct current power supply, such as the KL 30 or battery positive line, but instead connect through the array of power control switches. As such, the power control switches form a power control module within the electric control unit, allowing individual switches to be switched to selectively apply power to one or more of the function blocks supplied by the current path associated with that switch. As such, power may be applied to functional blocks, including devices, processors, sensors, actuators, and diagnostic modules, immediately prior to a wake-up operation being initiated. Conversely, when functional blocks are not in use, they may be selectively disconnected from the power supply to avoid idle current drain. Therefore, an ECU may be provided which has much lower idle current drain, without significantly increasing its complexity by necessitating complex power stages or associated integrated circuits for managing the same.

In embodiments, the control block is configured to operate the power control switches by transmitting wake commands thereto.

In embodiments, the plurality of switches are smart fuses. In this way, control over the delivery of power may be implemented using electronic fuse devices (eFuses), which may provide both switching and diagnostic capabilities, in combination with a low idle current draw. Furthermore, the use of smart fuses also removes the need to provide fuse arrangements, such as melting fuses, elsewhere for the associated internal and external blocks. It will be understood that smart fuses may also include high speed digital (HSD) switches, as well as other intelligent self-monitoring power switches.

In embodiments, the plurality of switches each include a control circuit and a semiconductor switch for switching between the closed state and the open state. In this way, switching is implemented electronically for providing a rapid reaction time. Such electronic switching implementations include smart fuses.

In embodiments, the control circuits include a current monitor for monitoring current on a respective current path between the least one respective functional block and the power supply input. In this way, the provision of current monitoring provides for additional power analytics for individual blocks within the ECU.

In embodiments, the control circuit further include a feedback module for transmitting monitored current data for the respective current path to the control block. In this way, power analytics data may be reported back to the control block for analysis and performance monitoring.

In embodiments, the functional blocks each include a power management stage sub-block, and wherein the power control switches are connected between the power management stage sub-block of the respective at least one functional block and the power supply input. In this way, the power control switches may control the current applied to the power management stage sub-blocks, such as power management integrated circuits (PMICs) or other electrical driver integrated circuits.

In embodiments, the plurality of functional blocks includes at least one internal block, wherein the ECU includes the at least one internal block. In this way, the power control switches may control power to functional blocks within the same ECU, as well as external blocks which may sit external to the ECU. External blocks will typically include less complex sub-blocks.

In embodiments, the control block further includes an interface for receiving input commands from a central vehicle controller (CVC), and wherein the control block is configured to switch the power control switches in response to the input commands. In this way, the CVC may centrally control the power status of blocks associated with a particular control block. As such, for instance, in zonal architectures, global commands may be issued by the CVC to a number of ECUs acting as zone controllers, which in turn causes the switching of power control switches in each applicable zone for powering functional blocks therein. This provides for related functional blocks in different zones to be powered up concurrently under the control of the CVC. For example, functional blocks associated with keyless entry may be powered up simultaneously to, for instance, power the door-lock actuators to enable or trigger the unlocking of all the doors on the vehicle at once.

In embodiments, the vehicle power architecture further includes a communication line connecting between the control block and the power control switches for transferring commands for switching individual ones of the power control switches. In this way, the higher current power control switches may be separated from the relatively low current control block within the ECU. In embodiments, the communication line may be implemented as a simple steering line.

According to a further aspect, there is provided a power control module for an electric control unit, ECU, in a vehicle power architecture having a plurality of functional blocks for implementing functions and a power supply input. The power control module includes a plurality of power control switches, each being switchable under the control of a control block in the ECU between a closed state where at least one respective functional block is connected to the power supply input and an open state where the at least one respective functional block is disconnected from the power supply input. In this way, a power control module may be provided for mitigating the idle current drain by functional blocks within a vehicle power architecture.

In embodiments, the plurality of power control switches are smart fuses. In this way, the power control module may be implemented as an array of smart fuses for implementing switching and additional diagnostic functionality.

In embodiments, the plurality of switches each include a control circuit, where each control circuit includes a current monitor for monitoring current on a respective current path between the at least one respective functional block and the power supply input.

In embodiments, the power control module further includes an interface for connecting to the control block and for receiving commands for switching individual ones of the power control switches.

According to a further aspect, there is provided a method of operating a electric control unit, ECU, in an vehicle power architecture having a plurality of functional blocks for implementing functions and a power supply input, the method including the steps of: transmitting a wake command from a control block in the ECU to at least one power control switch of a plurality of power control switches; switching, in response to the wake command, at the at least one power control switch, from an open state where the at least one respective functional block is disconnected from the power supply input to a closed state where at least one respective functional block is connected to the power supply input. In this way, a method is provided for mitigating the idle current drain by functional blocks within a vehicle power architecture. At the same time, component design may be simplified, and other system advantages may be provided, such as current feedbacks from the functional blocks.

In embodiments, the method further includes the steps of: transmitting a block shut-down command from the control block to at least one of the plurality of functional blocks; initiating a shut-down operation at the at least one functional block in response to the block shut-down command; transmitting a power shut-down command from the control block to the at least one respective power control switch associated with the at least one functional block; and switching, at the at least one power control switch, in response to the power shut-down command, from a closed state where at least one respective functional block is connected to the power supply input to an open state where the at least one respective functional block is disconnected from the power supply input. In this way, proper shut-down operations can be performed to ensure data is secure before a functional block is powered down.

BRIEF DESCRIPTION OF DRAWINGS

Illustrative embodiments will now be described with reference to the accompanying drawings in which.

DETAILED DESCRIPTION

The present disclosure is particularly relevant for automotive applications and most particularly to multi domain controllers (MDCs) for use in both domain and zonal E/E architectures.

Figures 1, 2:
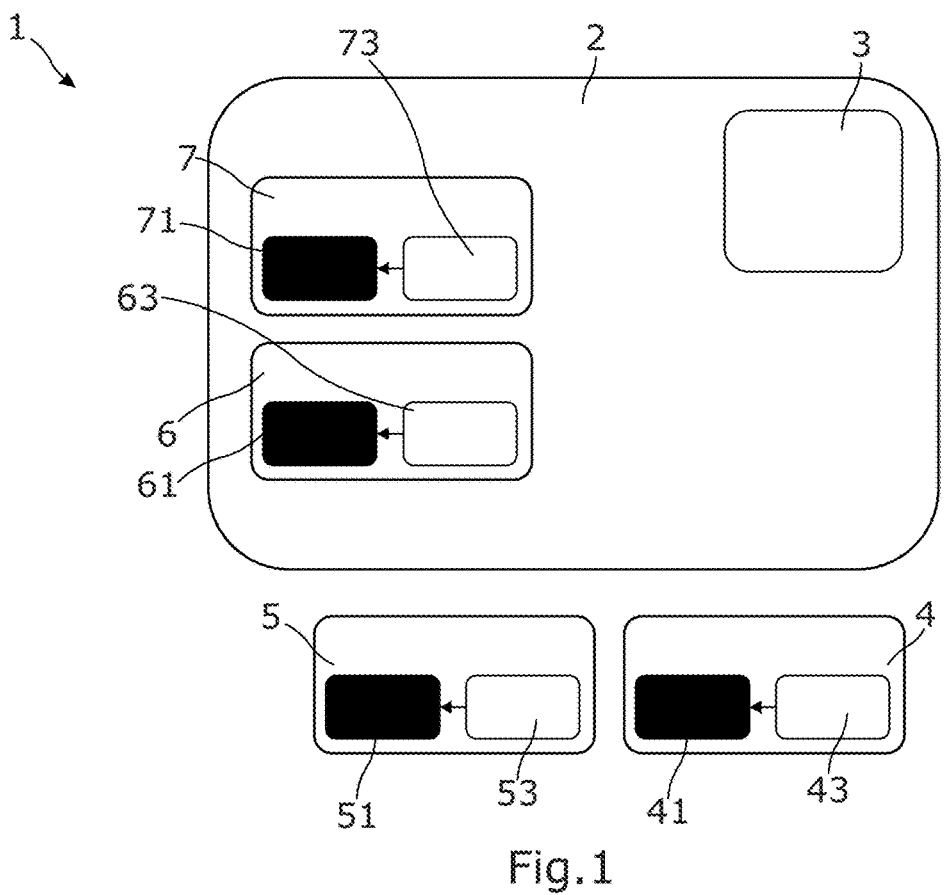
FIG. 1 shows a schematic illustration of a conventional power architecture.
FIG. 2 shows a schematic illustration of a conventional power architecture incorporating a central vehicle controller.
Figure 3:
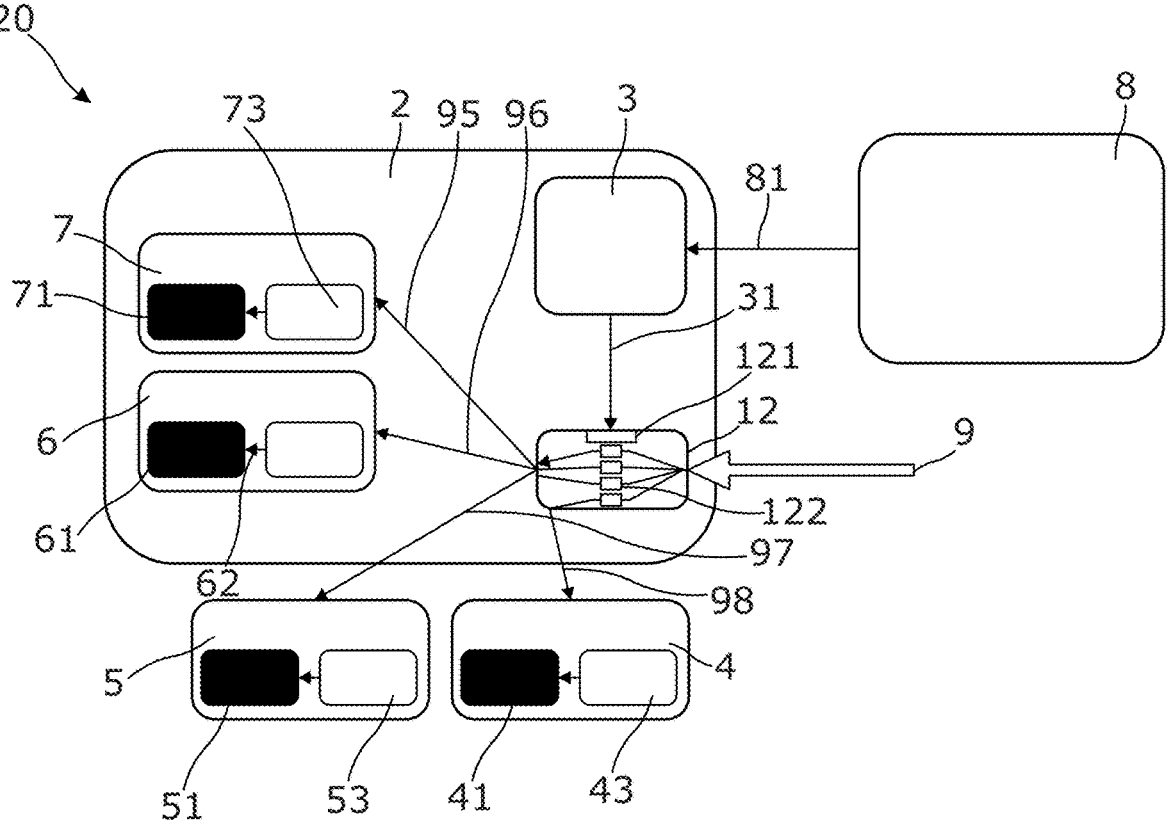
FIG. 3 shows a schematic illustration of a power architecture according to an illustrative embodiment.

FIG. 3 shows a power architecture 20 according to an illustrative embodiment. As shown, this is similar to the arrangement shown in FIG. 2, with corresponding numerals being used for corresponding features, but with the addition of a power control module 12 as a part of the electric control unit (ECU). As with the arrangements shown in FIGS. 1 and 2, the architecture 20 includes external blocks 4,5 which are external to the ECU 2 and internal blocks 6,7 which are internal to the ECU 2. The blocks 4, 5, 6, 7 are used to perform various functions in the vehicle and include subblocks 41, 43, 51, 53, 61, 63, 71, 73 for implementing those functions. In addition, the ECU 2 further includes the power control module 12 which connects between the power supply input 9, in this case the KL 30 rail, and the blocks 4, 5, 6, 7. The power supply input 9 provides an always live, continuous direct current from the vehicle battery. In this embodiment, the ECU 2 is also connected to an external Central Vehicle Controller (CVC) 8 via CAN bus 81. In other embodiments, other vehicle bus system may be used, such as ethernet.

The power control module 12 includes a plurality of smart fuses 122, each being connected between the power supply input 9 and the power lines 95, 96, 97, 98 that feed the blocks 4, 5, 6, 7. As such, the blocks 4, 5, 6, 7 are not directly connected to the power supply, but instead are connected via an associated switchable smart fuse within the power control module 12. The power control module 12 further includes an interface 121, which connects to a steering line 31 fed from the control block 3. As such, the steering line 31 functions as a communication line for transmitting control signals from the control block 3 to the to the smart fuses 122, which are independently switchable in response thereto. In this embodiment, the interface 121 is provided as a common interface for the power control module 12, with the control signals being multiplexed or encoded to address switch signals to particular smart fuses 122.

In this respect, each smart fuse 122 is independently addressable by the control block 3 for selectively controlling their switching to establish a current path from the power supply input 9 to the respective block or blocks 4, 5, 6, 7 connected thereto. Although in this embodiment, the four smart fuses 122 are each associated with a single respective block 4, 5, 6, 7, it will be understood that in other embodiments, more than one block may be connected to a particular smart fuse 122. This may allow power to be applied to blocks that are functionally associated with one another in one operation using a single smart fuse 122, thereby minimizing costs. The smart fuses 122 can be controlled centrally by the CVC 8, which instructs the control block 3 to selectively switch on particular smart fuses to selectively power up specific functional blocks 4, 5, 6, 7, as needed.

Each smart fuse 122 includes an internal control circuit with a sensor module for sensing the current conducted through the associated current path. In response to a current read-out request from the control block 3, the control circuit is configured to transmit the current measurement back to the control block 3 via steering line 31. This can thereby provide data for diagnostic and performance evaluation. For example, variations in current drawn by a particular block may be used for early failure detection or fault analysis.

In use, in response to a trigger, for example a command issued by the CVC 8, the control block 3 may implement a wake-up process for activating one or more of the blocks 4, 5, 6, 7 by trigging the associated one or more smart fuses 122 in the power control module 12. As such, blocks 4, 5, 6, 7 can be switched on to perform their respective functions in response to commands from the control block 3.

To shut down a particular block 4, 5, 6, 7 that is active, a shut-down control signal may be first transmitted from the control block 3 to the block in question. This allows the block to implement a controlled shut-down procedure, for instance, by securing any data. Once this has occurred, the control block 3 may then transmit a power shut-down command to the smart fuse 122 associated with the respective block to disconnect the power supply.

During operation, each smart fuse 122 will draw current from the power supply input 9 in order to maintain monitoring and diagnostic operations of its respective control circuit. However, the idle current associated with this is orders of magnitude less than that which would be required to supply power directly to the blocks 4, 5, 6, 7. Accordingly, the ECU 2 within the vehicle power architecture 20 draws a lower idle current from the power supply, thereby minimizing current drain from the vehicle battery. At the same time, when needed, power may be delivered quickly by activating specific blocks under the control of the control block 3. Furthermore, the architecture 20 avoids the need for complex wake up stages. This thereby allows the design of the ECU 2 to be simplified. Moreover, the use of smart fuses allows for the incorporation of diagnostic and feedback functionality, thereby providing for additional power analytic data for specific blocks 4, 5, 6, 7 to be monitored within the architecture. Advantageously, this also allows individual functional blocks to be separately secured by the smart fuses, thereby providing greater security, and replacing need for melting fuses elsewhere in the power architecture.

It will be understood that the embodiments illustrated above show an application only for the purposes of illustration. In practice, embodiments may be applied to many different configurations, the detailed embodiments being straightforward for those skilled in the art to implement.

For example, although in the above embodiments, the powering up of the functional blocks enables subsequent control by the control block, it will be understood that arrangements may be provided where operation of the functional blocks is automatically implemented on their start-up. In such arrangements, the power control switches may thereby directly trigger specific functions by selectively powering certain blocks.

What is claimed is:

1. A vehicle power architecture, comprising:
   a plurality of functional blocks, each functional block of the plurality of functional blocks configured to implement a respective function; and
   an electric control unit (ECU) comprising:
      a control block configured to control the plurality of functional blocks to perform the respective functions,
      a power supply input for receiving a direct current power supply, and
      a plurality of smart fuses,
      wherein each of the plurality of smart fuses is arranged between the power supply input and a respective functional block of the plurality of functional blocks,
      wherein the control block, in response to receiving a wake command, is configured to send a signal to one or more of the smart fuses, associated with the respective one or more functional blocks required to respond to the wake command, to switch the one or more smart fuses from an open state, where the respective one or more functional blocks are disconnected from the power supply input, to a closed state where the one or more functional blocks are connected to the power supply input;

wherein the plurality of functional blocks consist of one or more functional blocks which are internal to the ECU and one or more functional blocks which are external to the ECU.

2. The vehicle power architecture according to claim 1, wherein each smart fuse of the plurality of smart fuses comprises a control circuit and a semiconductor switch configured to switch between the closed state and the open state.

3. The vehicle power architecture according to claim 2, wherein each control circuit comprises a current monitor configured to monitor current on a respective current path between the respective one or more functional blocks and the power supply input.

4. The vehicle power architecture according to claim 3, wherein each control circuit further comprises a feedback module configured to transmit monitored current data for the respective current path to the control block.

5. The vehicle power architecture according to claim 1, wherein each functional block comprises a power management stage sub-block, and wherein the smart fuses are connected between the power management stage sub-block of the respective one or more functional blocks and the power supply input.

6. The vehicle power architecture according to claim 1, wherein the control block further comprises an interface configured to receive input commands from a central vehicle controller, and wherein the control block is configured to switch the smart fuses in response to the input commands.

7. The vehicle power architecture according to claim 1, further comprising a communication line connecting between the control block and the smart fuses configured to transfer commands for switching individual ones of the smart fuses.

8. A power control module for an electric control unit (ECU) in a vehicle power architecture having a plurality of functional blocks, each functional block of the plurality of functional blocks configured to implement a respective function and a power supply input, comprising:

a plurality of smart fuses for controlling the delivery of power to the plurality of functional blocks, each being switchable under the control of a control block in the ECU, and arranged between the power supply input and a respective functional block of the plurality of functional blocks;

wherein the control block, in response to receiving a wake command, is configured to send a signal to one or more of the smart fuses associated with the respective one or more functional blocks required to respond to the wake command, to switch the one or more smart fuses from an open state where respective one or more functional blocks are disconnected from the power supply input to a closed state where the respective one or more functional blocks are connected to the power supply input, wherein the plurality of functional blocks consist of one or more functional blocks which are internal to the ECU and one or more functional blocks which are external to the ECU.

9. The power control module according to claim 8, wherein each of the plurality of smart fuses comprises a control circuit and a semiconductor switch configured to switch between the closed state and the open state.

10. The power control module according to claim 8, wherein each control circuit comprises a current monitor configured to monitor current on a respective current path between a respective functional block and the power supply input.

11. The power control module according to claim 10, wherein each control circuit further comprise a feedback module configured to transmit monitored current data for the respective current path to the control block.

12. The power control module according to claim 8, wherein the functional blocks each comprise a power management stage sub-block, and wherein the smart fuses are connected between the power management stage sub-block of the respective one or more functional blocks and the power supply input.

13. The power control module according to claim 8, further comprising an interface configured to connect to the control block and receive commands for switching individual ones of the smart fuses.

14. A method of operating an electric control unit (ECU) in a vehicle power architecture having a plurality of functional blocks, each functional block of the plurality of functional blocks configured to implement a respective function and a power supply input, the method comprising:

transmitting, in response to a wake command, a signal from a control block in the ECU to one or more smart fuses associated with the functional blocks required to respond to the wake command; and switching, in response to the signal, the one or more smart fuses, from an open state where the respective one or more functional blocks are disconnected from the power supply input, to a closed state where the respective one or more functional blocks are connected to the power supply input;

wherein the plurality of functional blocks consist of one or more functional blocks which are internal to the ECU and one or more functional blocks which are external to the ECU.

15. The method according to claim 14, further comprising:

transmitting a block shut-down command from the control block to at least one functional block of the plurality of functional blocks;

initiating a shut-down operation at the at least one functional block in response to the block shut-down command;

transmitting a power shut-down command from the control block to the at least one respective smart fuse associated with the respective at least one functional block; and switching, at the at least one smart fuse, in response to the power shut-down command, from a closed state where the respective at least one functional block is connected to the power supply input to an open state where the respective at least one functional block is disconnected from the power supply input.

16. The method according to claim 14, further comprising:

monitoring a current on a respective current path between a respective functional block and the power supply input.

17. The method according to claim 16, further comprising:

transmitting monitored current data for each respective current path to the control block.

* * * * *